(No Model.)
W. & D. BLACKSTONE.
HAY RAKE AND LOADER.
No. 317,614. Patented May 12, 1885.
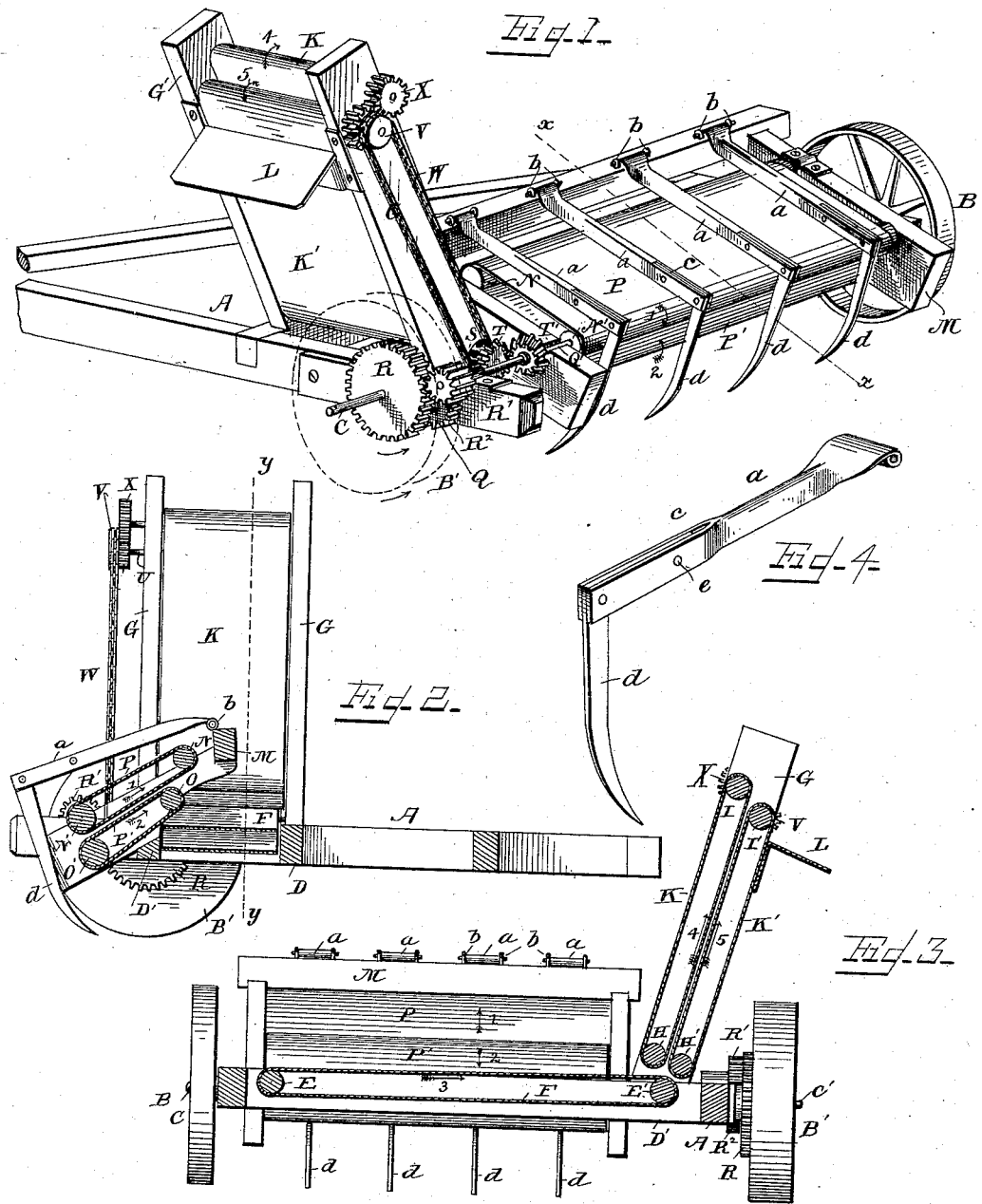
WITNESSES
F. L. Durand
E. G. Siggers
Wm. Blackstone
Daniel Blackstone
INVENTORS
by C. A. Snow
Attorneys

UNITED STATES PATENT OFFICE.

WILLIAM BLACKSTONE AND DANIEL BLACKSTONE, OF SHELBYVILLE, ILL.

HAY RAKE AND LOADER.

SPECIFICATION forming part of Letters Patent No. 317,614, dated May 12, 1885.

Application filed April 24, 1884. (No model.)

*To all whom it may concern:*

Be it known that we, WILLIAM BLACKSTONE and DANIEL BLACKSTONE, citizens of the United States, residing at Shelbyville, in the county of Shelby and State of Illinois, have invented a new and useful Hay Rake and Loader, of which the following is a specification, reference being had to the accompanying drawings.

This invention has relation to hay rakes and loaders; and it consists in the construction and novel arrangement of parts, as will be hereinafter fully described, and particularly pointed out in the claims.

Figure 1 is a view in perspective of a hay rake and loader embodying the improvements of our invention. Fig. 2 is a vertical longitudinal section on the line $x\ x$, Fig. 1. Fig. 3 is a transverse vertical section on the line $y\ y$, Fig. 2; and Fig. 4 is a perspective detail view of one of the rake-teeth.

Referring by letter to the accompanying drawings, A designates the main frame of the machine, which is mounted on wheels B and B', journaled on spindles C C', secured to the side rails of the main frame near their rear ends, as shown. In the transverse rails D and D' of the main frame are journaled the rollers E E', one near each side of the frame, over which runs an endless apron, F.

From the transverse rails D and D' rise two inclined rails, G G', at the side of the frame nearest the drive-wheel B', and these rails G G' form the bearings for the rollers H H' near their lower ends, and the rollers I I' near their upper ends, for the two endless aprons K K'. These inclined rails G G' are provided, near the upper ends of the endless aprons K K', with a guide-board, L, over which the hay passes to the wagon.

To the right of the rails G G', and secured upon the rear transverse rail, D', is an auxiliary frame, M, which inclines upwardly and forwardly, as shown, its front rail forming the rake-head. This frame M is provided with rollers N N' and O O' for the upper and lower inclined endless aprons P and P'. The shafts Q Q' of the rear rollers, N' O', of the aprons P and P' extend to the drive-wheel B', and have bearings in the side rail of the main frame.

The drive-wheel B' is provided on its inner face with a cog gear-wheel, R, which meshes with a broad pinion, R', on the end of the shaft Q', and this pinion R' meshes with a narrow pinion, R², on the end of the shaft Q, to rotate the endless aprons P P' in the direction of the arrows 1 and 2.

The shaft S of the roller E' projects rearwardly from its bearing, and is provided on its projecting end with a combined miter-pinion and sprocket-wheel, T, which engages a miter-pinion, T', at its right side on the shaft Q'.

The shaft U of the upper roller, I, between the rails G G', is provided with a combined cog-pinion and sprocket-wheel, V, on its projecting rear end, and the sprocket-wheel on this pinion is connected with the sprocket-wheel on the miter-pinion T by an endless chain, W. The teeth of the pinion V engage the teeth of a pinion, X, on the shaft of the roller I', and the endless aprons K K' are rotated in the direction of the arrows 4 and 5. The endless apron F rotates in the direction of the arrow 3, and carries the hay to the elevator-aprons, which carry it up between them and discharge it over the guide-board.

The arms $a$ of the rake-teeth are hinged between eyes $b\ b$ on the rake-head, and are bifurcated at $c$ for a portion of their length, and the angular upper ends of the rake-teeth $d$ are pivoted in the rear ends of these bifurcations, as shown. The rake-arms $a$ and the angle-arms of the rake-teeth $d$ are perforated laterally for the insertion of wooden break-pins $e$, so that when a tooth meets with an obstruction the wooden pin will break, and thus prevent the tooth from being broken. The hay is taken from the rake-teeth by the endless aprons P P', and carried between them to the apron F, and by it to the elevator-aprons.

By this construction hay can be raked and loaded in very windy weather, as the canvas aprons are positive in their action.

Having thus described our invention, what we claim as new, and desire to secure by Letters Patent of the United States, is—

1. The combination, with the main frame, provided with the endless apron F and wheels B B', of the endless aprons P P', having roller-bearings in the auxiliary frame M, the shaft Q', provided with the broad pinion R' and the miter-pinion T', the shaft Q, provided with the narrow pinion R², the cog-wheel R on the drive-wheel B', the combined miter-pinion and sprocket-wheel T, the combined cog-pinion and pulley V, the cog-pinion X, chain W, and the endless aprons K K' and P P', and the hinged rake-teeth connected to the auxiliary frame, substantially as specified.

2. The combination, with the bifurcated and laterally-perforated rake-arm, of the rake-tooth having the perforated angle-arm at its upper end pivoted in the bifurcation and secured in place near its forward end by a wooden break-pin, substantially as specified.

In testimony that we claim the foregoing as our own we have hereto affixed our signatures in the presence of two witnesses.

WILLIAM BLACKSTONE.
DANIEL BLACKSTONE.

Witnesses:
E. HOMRIGHOUS,
HENRY FUCHRING.